United States Patent [19]
Lawton

[11] 3,846,698
[45] Nov. 5, 1974

[54] OVERCURRENT EVENTS MONITORING SYSTEM

[75] Inventor: David K. Lawton, Anaheim, Calif.

[73] Assignee: Westinghouse Electric Corporation, Pittsburgh, Pa.

[22] Filed: Sept. 25, 1973

[21] Appl. No.: 400,600

[52] U.S. Cl.............. 324/51, 307/234, 307/235 R, 324/102, 340/253 R
[51] Int. Cl...................... G01r 31/02, G04r 19/16
[58] Field of Search....... 324/51, 102, 103, 55, 133, 324/54; 307/234, 235 R; 340/253 R, 253 A, 253 P

[56] References Cited
UNITED STATES PATENTS

| | | |
|---|---|---|
| 3,775,675 | 11/1973 | Freeze et al. ......................... 324/51 |
| 3,789,293 | 1/1974 | Freeze ................................. 324/51 |

*Primary Examiner*—Gerard R. Strecker
*Attorney, Agent, or Firm*—R. W. Smith

[57] ABSTRACT

An overcurrent events monitoring system includes a monitor unit having digital logic and constant linear timing circuits to count and store both the total of overcurrent events occurring in an electrical circuit under test and the number of overcurrent events which are sustained. A readout and tester unit is detachably connected to the monitor for interrogating and testing a monitor unit. A numerical display visually indicates the events stored in the monitor unit binary counters which are resettable after the counter readouts are provided.

10 Claims, 4 Drawing Figures

OVERCURRENT EVENTS MONITORING SYSTEM

CROSS-REFERENCE TO RELATED PATENTS

This invention is related to U.S. Pat. No. 3,789,293 issued Jan. 29, 1974 to John A. Freeze and U.S. Pat. No. 3,775,675 issued Nov. 27, 1973 to John A. Freeze et al., both assigned to the assignee of this invention.

BACKGROUND OF THE INVENTION

This invention relates to an improved electrical events monitoring system and more particularly to an overcurrent monitoring system including digital logic circuits for detecting and storing excess current conditions occurring in an electrical circuit under test and a readout and tester unit for indicating the electrical condition of the monitoring circuits and displaying of the events intended.

In the above-identified U.S. Pat. Nos. 3,775,675 issued Nov. 27, 1973 and 3,789,293 issued Jan. 29, 1974 electrical circuit monitors are disclosed and claimed for detecting overcurrent or fault current events occurring in an electrical apparatus such as a power transformer. The events are detected and distinguished as between sustained and momentary excessive current conditions which are developed. The total number and the sustained character of excess current conditions are distinguished by resistance-capacitance time delay networks connected to be responsive to voltages corresponding to the current magnitudes in the power transformer apparatus.

Due to the variations and the types and amplitude of excessive current conditions it is desirable to provide a monitoring system which is substantially isolated and independent of the differences in the overcurrent events which may be developed in the apparatus. It is further desirable to have more precise time circuits for distinguishing between the sustained and momentary overcurrent events and in which the events are counted and recorded without error from noise or spurious electrical signals. It is further desirable to provide for the use of a large number of monitor units which are to be simple, rugged, reliable and manufactured at reduced costs and to have a readout unit for sampling many of the monitor units and test the electrical condition of the monitor unit such as by testing a battery used to supply the monitoring circuits. The readout and tester unit is desired to also be simple to operate, rugged for portable use, and reliable in operation.

The present invention is directed to the aforementioned desirable considerations in providing an improved overcurrent monitoring system as briefly summarized hereinafter.

SUMMARY OF THE INVENTION

In accordance with the present invention an overcurrent monitoring system includes an improved electrical events monitor unit having an input receiving either switch closure or voltage signals and a logical threshold detector responsive to the inputs for establishing a binary logical signal when a predetermined excess current magnitude is developed in an electrical circuit under test. A pulse stretcher circuit having a timed pulse output maintains the threshold detector output logic signal to prevent false indication by instantaneous fluctuations in the overcurrent condition. The pulse stretcher output triggers a total events binary counter. A pulse interval recognition logic circuit is also connected to the pulse stretcher output to produce a timed logic pulse output which has a constant linear slope for a predetermined time that the pulse stretcher logic output is maintained. Upon reaching the desired logic pulse state at the output of the recognition logic circuit, a sustained events binary counter is triggered. The total events and sustained events are recorded by being stored in the respective binary counters.

A readout and tester unit is arranged to be detachably connected to the monitor unit and increases a numerical display section including a select switch for displaying the count stored in each of the monitor unit counters. The readout and tester unit includes a source of reset signals for resetting the monitor unit counters to a zero count after the readings have been noted. A battery test indicator is provided for testing the condition of a monitor unit battery power supply and an internal battery power supply of the readout and tester unit is provided with a recharging circuit and a battery condition indicator.

It is a general feature of this invention to provide an improved overcurrent events monitoring system including an improved monitor unit having digital logic circuits for detecting the excessive current conditions in an electrical circuit under test by establishing binary logic signals in response to each detected event and distinguishing and counting events of momentary and sustained characteristics by timing circuits which have precisely control constant linear time variation characteristics. Another important feature of the invention is to provide a readout and tester unit detachably connected to a monitor unit of this invention to readily and easily provide a visual readout of the events counted and stored and to indicate the electrical condition of the monitor unit circuit. These features and other advantages and objects of the present invention will become apparent from the following description of the drawings having views briefly described hereinafter.

BRIEF DESCRIPTION OF THE DRAWING

FIG. 4 is a time graph of signals which may occur in the monitor unit circuit illustrated in FIG. 2.

DESCRIPTION OF THE PREFERRED EMBODIMENT

Figure 1:
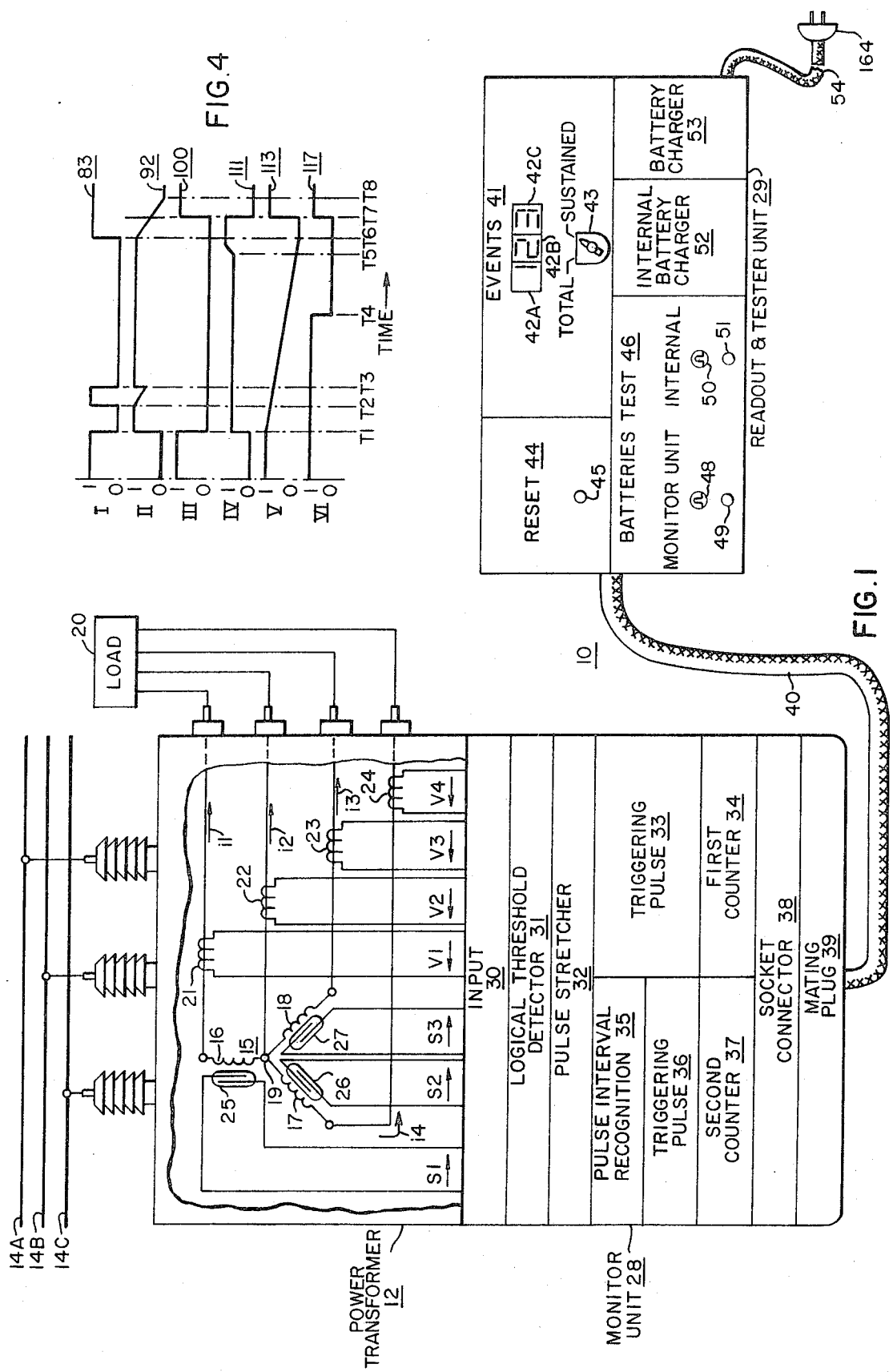
FIG. 1 is a diagrammatic view illustrating the arrangement of a power transformer with an overcurrent events monitoring system made in accordance with the present invention.

FIG. 1 is a diagrammatic view of the overcurrent events monitoring system 10 as it may be utilized in an arrangement for monitoring the excess current conditions in an electrical apparatus such as provided by a power transformer 12. The power transformer 12 may correspond to the same apparatus described in the above-identified U.S. Pat. Nos. 3,775,675 and 3,789,293 which is of a type connected to power lines 14A, 14B and 14C conducting 60 Hertz electrical power. The transformer 12 typically includes a secondary 15 defining a circuit under test having four terminals connected to phase windings 16, 17 and 18 and to a neutral connection 19 with each terminal carrying a separate one of the currents i1, i2, i3 and i4, respectively, to be monitored and being suitably connected to a load 20.

An analog current sensing arrangement formed current rest transformers 21, 22, 23 and 24 are connectable within the power transformer 12 to be responsive to the time varying magnitudes of currents i1, i2, i3 and i4 respectively. The transformers 21, 22, 23 and 24 develop voltage signals V1, V2, V3 and V4, respectively, which vary in magnitude time in accordance with the magnitude of the associated current linked to the current transformer. A logical current sensing arrangement is formed by magnetically actuated switches 25, 26 and 27 inductively coupled to the windings 16, 17 and 18 to provide additional or alternative switch closure signals S1, S2 and S3.

The overcurrent events monitoring system 10 includes a monitor unit 28 and a readout and tester unit 29 each made in accordance with the present invention. The monitor unit is mounted at the power transformer 12 to receive the voltage signals V1, V2, V3 and V4 and the switch closure signals S1, S2 and S3 provided by semi-permanent connections such as by soldering at an input 30 of the unit 28. The monitor unit 28 further generally includes a logical threshold detector 31 responsive to the input 30, a pulse stretcher 32, a triggering pulse circuit 33, and a first or total events binary counter 34. A pulse interval recognition circuit 35 is also provided in the monitor unit 28 as is an associated triggering pulse circuit 36 and a second or sustained events binary counter 37. The counter outputs of the monitor unit 28 are connected to an external socket connector 38 adapted to detachably receive a mating plug connector 39 terminating a cable conductor 40 associated with the readout and tester unit 29.

The readout and tester unit 29 generally includes a decoding and numerical display section 41 having three numerical display light assemblies 42A, 42B and 42C and a two position selector switch 43 for selecting the readout of either of the binary counters 34 or 37 in the monitor unit 28. The unit 29 further generally includes a monitor reset section 44 having a switch 45 for initiating a reset signal to the monitor unit binary counters 34 and 37. A batteries test section 46 is also included in the unit 29 and includes an indicator lamp 48 and associated switch 49 for testing the electrical condition of the monitor unit power supply as provided by a battery, described hereinbelow. An indicator lamp 50 and associated switch 51 are provided in the section 46 for testing the condition of an internal battery power supply included in an internal battery section 52 of the unit 26. A battery charger section 53 is connected to an external cord conductor cord 54 for charging the batteries in the battery section 52 from a conventional one hundred twenty volts A.C. power source.

Figure 2:
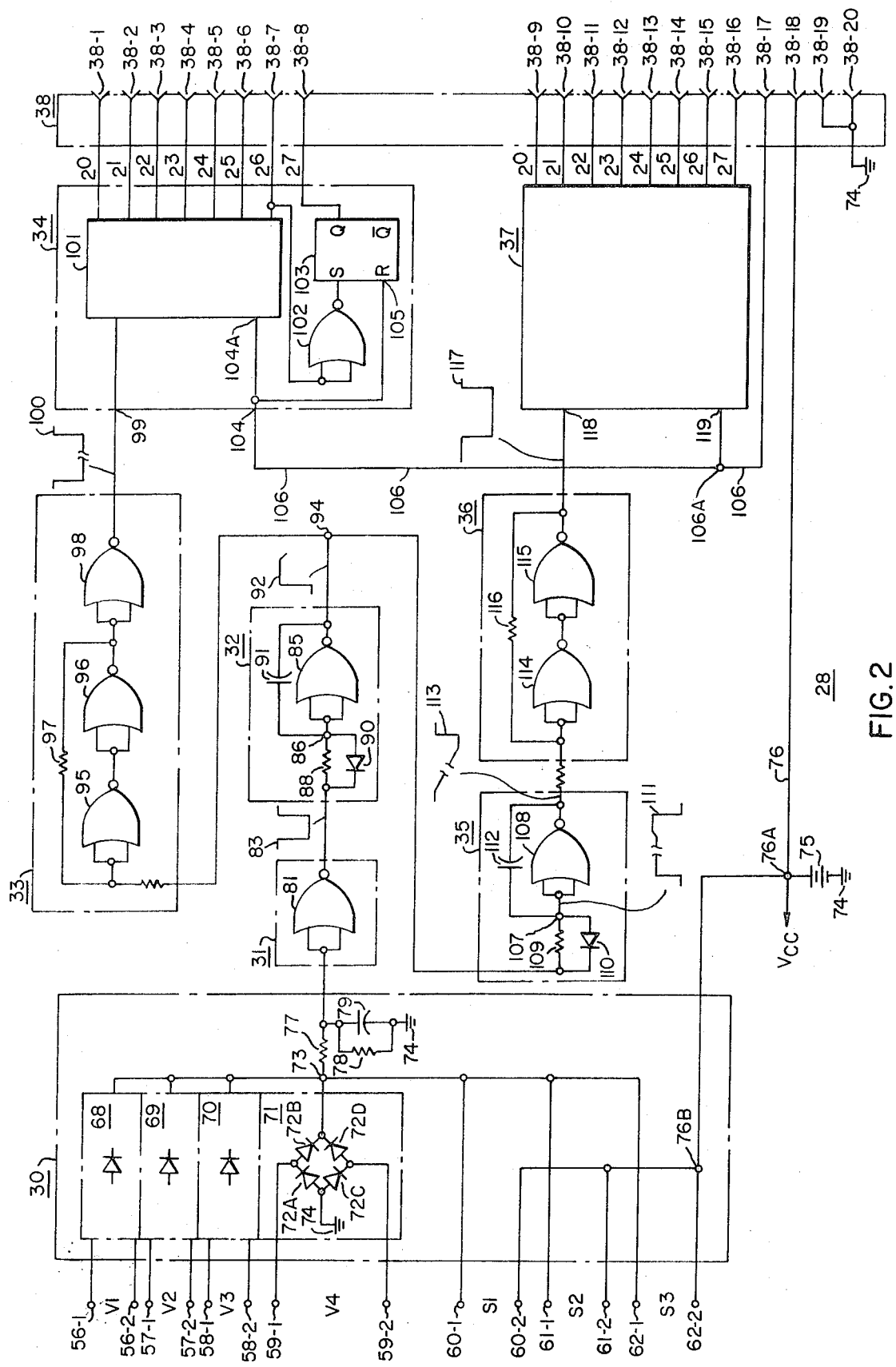
FIG. 2 is a logic circuit diagram of the monitor unit shown in FIG. 1.

Referring now to FIG. 2 which illustrates a logic circuit diagram of the monitor unit 28, there is shown the input 30 having a first set of pairs of input terminals 56-1 & 56-2, 57-1 & 57-2, 58-1 & 58-2 and 59-1 & 59-2 and a second set of pairs of input terminals 60-1 & 60-2, 61-1 & 61-2 and 62-1 & 62-2. The pairs of terminals designated 56-1 through 58-2 are adpated to receive the voltage signals V1, V2, V3 and V4 developed by the current transformers 21, 22, 23 and 24, respectively, shown in FIG. 1. The logical current responsive sensing arrangement including switches 25, 26 and 27 preferably are of the reed-switch type actuated by the magnetic flux associated with the current in the secondary windings 16, 17 and 18. Accordingly, these switches are arranged to be normally open and then closed when the current through an associated secondary winding reaches a predetermined magnitude which corresponds to an overcurrent condition.

The pairs of input terminals designated 60-1 & 60-2 through 62-1 & 62-2 are provided for connection across the switches 25, 26 and 27, respectively, when it is desirable to replace or supplement the analog current responsive sensing arrangement including the current transformers shown in FIG. 1. It is contemplated that predetermined combinations of the analog and logical current sensing arrangements including selected ones of the switches 25, 26 and 27 and the current transformers 21, 22, 23 and 24 may be connected to the above-identified first and second sets of input terminal pairs.

The current transformer voltages V1, V2, V3 and V4 are applied from the first set of input terminal pairs to rectifier circuits 68, 69, 70 and 71 and all have the configuration as shown in detail for the rectifier circuit 71. A full wave bridge including diodes 72A, 72B, 72C and 72D forms the circuit 71 which is connected to receive the voltage V4 to develop a current responsive full wave rectified positive voltage output therefrom across a common input junction 73 to the remainder of the monitor unit 28 and a circuit common ground 74. Accordingly, the outputs of the other rectifier circuits 68, 69 and 70 rectify the sixty Hertz power line frequency of the voltages V1, V2 and V3 to develop positive polarity voltage signals at the common input junction 73 which have amplitudes corresponding to the magnitudes of the currents i1, i2, i3 and i4.

The monitor unit circuit has a direct current power supply provided by a battery 75 which is preferably of a silver oxide or nickel-cadmium type having an optimum output in the order of six volts. The negative terminal of the battery is connected to the common ground 74 and the positive battery terminal is connected to a common circuit power supply conductor 76 at junction 76A to provide the positive circuit supply voltage $V_{CC}$ thereon.

Each of the pairs of input terminal 60-1 & 60-2, 61-1 & 61-2 and 62-1 & 62-2 is connected in series with the input junction 73 and the junction 76B which is common with the positive terminal of the battery 75. Accordingly, upon closing of any of the reed switches 25, 26 and 27 shown in FIG. 1, a positive voltage will be applied to the input junction 73. The common input circuit 30 of the monitor unit 28 includes a conditioning and low pass filtering circuit including a resistor 77 connected in series with the junction 73 and a parallel connected resistance 78 and capacitor 79 connected between the resistor 77 and the common ground 74. The filtering circuit is intended to suppress high frequency noise signals which may develop at the input junction 73 from the current sensing arrangements.

The logical threshold detector 31 is formed by a two-input NOR logic gate 81 having the two input connected together and to the output of the low pass filtering elements. The NOR gate 81 is of the COS/MOS digital integrated circuit type and in one preferred embodiment is included in a type CD4001A package described in the RCA Data Book designated Solid State SSD-203 available from the RCA Corporation, Somerville, New Jersey. All of the NOR gates shown in FIG. 2 and described herein below are of the same type as the gate 81 in one preferred embodiment. When the amplitude of the positive voltage applied to the input of the NOR gate 81 reaches its threshold value, a logic output signal 83 goes from a one logic state to a zero logic state. This occurs when the magnitude of the current being monitored reaches a predetermined excessive current magnitude. Accordingly, the binary logic signal 83 is initiated when an overcurrent event occurs and remains until the current being monitored drops below the excess current magnitude.

The pulse stretcher circuit 32 includes a two-input NOR logic gate 85 having the two inputs connected together at junction 86 and to a polarity sensitive timing network in accordance with a principal feature of this invention. A resistor 88 is connected in parallel with a diode 90 to form the timing network with the parallel connection series connected to the junction 86 such that the positive pole of the diode 90 is directed toward the junction 86. A timing capacitor 91 is connected across the gate input junction 86 and the gate output to provide a linear amplifier mode of operation comparable to the operation of an operational amplifier. In cooperation with the resistor 88, the capacitor 91 establishes a predetermined delay in the logic output signal 92 thereof by holding a one logic state after the zero input logic state in signal 83 has been removed. For example, the capacitor 91 has a value of 0.01 microfarad and the resistor 88 has a value of approximately 1 megohm and delays or stretches the one state of pulse 92 by approximately 20 milliseconds as also described hereinbelow in connection with the description of FIG. 4.

A circuit junction 94 is formed by connection of the pulse stretcher circuit 32 to both the input to the first triggering pulse logic circuit 33 and to the input to the pulse interval recognition logic circuit 35. The circuit 33 includes two tandem connected two-input NOR gates 95 and 96 each having the two inputs thereof connected together with the output of the gate 95 connected directly to the inputs of the gate 96. A resistor 97, preferably having a value of 2.2 megohm, is coupled from the output of the gate 96 to the inputs of the gate 95 to form a bistable circuit operation of the Schmitt trigger type. A two-input NOR gate 98 is connected between the output of the NOR gate 96 and provides the output of circuit 33 to an input pulse input 99 of the total events binary counter 34. The triggering pulse logic circuit 33 provides a sharp input triggering logic signal 100 to the counter 34 with a fast rise time and futher isolates and prevents possible noise signals within the monitoring unit circuit from triggering the counter 34. Upon the zero to one state logic being initiated in the time controlled pulse stretcher signal 92, a one to zero logic pulse is initiated in the output signal 100 of the gate 98 to advance one count in the binary counter 34 as described hereinafter.

The binary counter 34 is an eight bit binary type which in one embodiment includes a seven bit binary counter circuit 101 of the COS/MOS integrated circuit type CD 4024A described in the aforementioned Data Book RCA Solid State SSD-203 available from RCA Corporation. Counter circuit 101 has seven stages with outputs connected to the terminals 38-1, 38-2, 38-3, 38-4, 38-5, 38-6, 38-7 of the connector 38. These outputs correspond to the $2^0$ through the $2^6$ output bits, as indicated in FIG. 2, at the outputs of the binary counter 101. To provide the eighth bit of the counter 34 the seventh or $2^6$ bit output is connected to the input of a two input NOR gate 102 being the same as the NOR gate 81 and having the two inputs thereof connected together. The output of gate 102 is connected to a set input of flip-flop circuit 103 which is a COS/MOS digital integrated circuit type 4013A described in the aforementioned data book available from the RCA Corporation. A "Q" output of the circuit 103 corresponding to the $2^7$ output bit of the counter 34 is connected to the connector terminal 38-8. A reset input 104 of the counter 34 is connected to the reset input 104A of the counter circuit 101 and to a reset input 105 of the flip-flop circuit 103 that are connected together and to a conductor 106 connected to the connector terminal 38-17.

The pulse interval recognition logic circuit 35, also forming an important feature of this invention, includes a two-input NOR gate 108 arranged to provide a circuit operation analogous to that of the pulse stretcher circuit 32. The two are connected together at the junction 107. A parallel connected resistor 109 and diode 110 are connected in series between the circuit junctions 94 and the common input junction 107 of the NOR gate 108. The diode 110 has its positive pole directed toward the input junction 107 of the gate 108. The signal 111 is developed in the input junction 107. A capacitor 112 is connected between the output and input of the gate 108 to correspond to the capacitor 91 in the pulse stretcher circuit 32.

The circuit 35 provides a predetermined time delay between the transition from the one to the zero logic state in the logic output signal 113 at the output of the gate 108 state as determined by the value of the capacitor 112 and resistor 109. In a preferred embodiment the capacitor 112 has a value of 0.1 microfarad and the resistor 109 is in the order of 1 megohm with the diode being of the conventional type 1N4003. This arrangement provides a linear amplifier mode of operation with constant current changes developed through the circuit as described more fully hereinbelow in connection with the description of a time graph of signals shown in FIG. 4. Briefly, the values of the elements noted provide a delay in reaching the logic zero state from the one state in the order of 200 milliseconds before it is effective to operate the triggering pulse circuit 36. This controls the time desired for establishing the number of sustained events which is an equivalent to slightly over ten cycles of the current being monitored.

The triggering pulse logic circuit 36 includes two-input NOR gates 114 and 115 connected together as are the NOR gates 95 and 96, respectively, and a resistor 116 is connected between the output of a NOR gate 115 and the input of the NOR gate 114. This provides a bistable mode of operation corresponding to that of a Schmitt trigger, as noted hereinabove, and a logic output signal 117 effective to trigger the sustained events binary counter 37. This second triggering pulse circuit 36 provides the fast pulse rise time in the signal 117 and also isolates the counter 37 from possible false triggering due to noise signals.

The sustained events binary counter 37 is identical to the total events binary counter 34 and therefore is not described in detail. Accordingly, the binary counter is of the eight bit type having the $2^0$ through the $2^7$ output bits connected respectively to the connector terminals 38-9, 38-10, 38-11, 38-12, 38-13, 38-14, 38-15 and 38-16. An input pulse input 118 of the binary counter 37 is connected to the output of the NOR gate 115 to receive the signal 117. A reset input 119 corresponding to the reset input 104 is connected to the conductor 106 at the junction 106A and the connector input terminal 38-17 so that upon a reset signal being provided at the terminal 38-17 both of the counters 34 and 37 are reset to a zero count. Accordingly, it is seen that the maximum count of both of the binary counters 31 and 34 is a count of two hundred fifty-five which has been found suitable for most applications. It is to be understood that any suitable eight bit binary counter may replace the circuits of the binary counters 34 and 37 if a higher number of counts is desired to be accumulated. For example, the binary counters 34 and 37 may be provided with a higher level of counts such as doubling the capacity to a count of five hundred eleven by providing one additional binary stage froming a nine bit counter circuit in each of the counters.

The battery 75, noted hereinabove, is the source of supply voltage $V_{CC}$ connected to each of the logic circuits described above at the appropriate terminals thereof, not shown, which are also connected a source of the common circuit ground 74. The battery 75 has a nominal value of six volts. The positive battery terminal is connected through the conductor 76 at the junction 76A to the connector terminal 38-18 for connection to the batteries test section 46 of the readout and tester unit 29 as described more fully hereinbelow. The connector 38 further includes two terminals 38-19 and 38-20 connected together and to the common source of ground 74 within the monitor unit 28 for purposes which will be explained in connection with the description of the readout and tester unit 29 following hereinafter.

Figure 3:
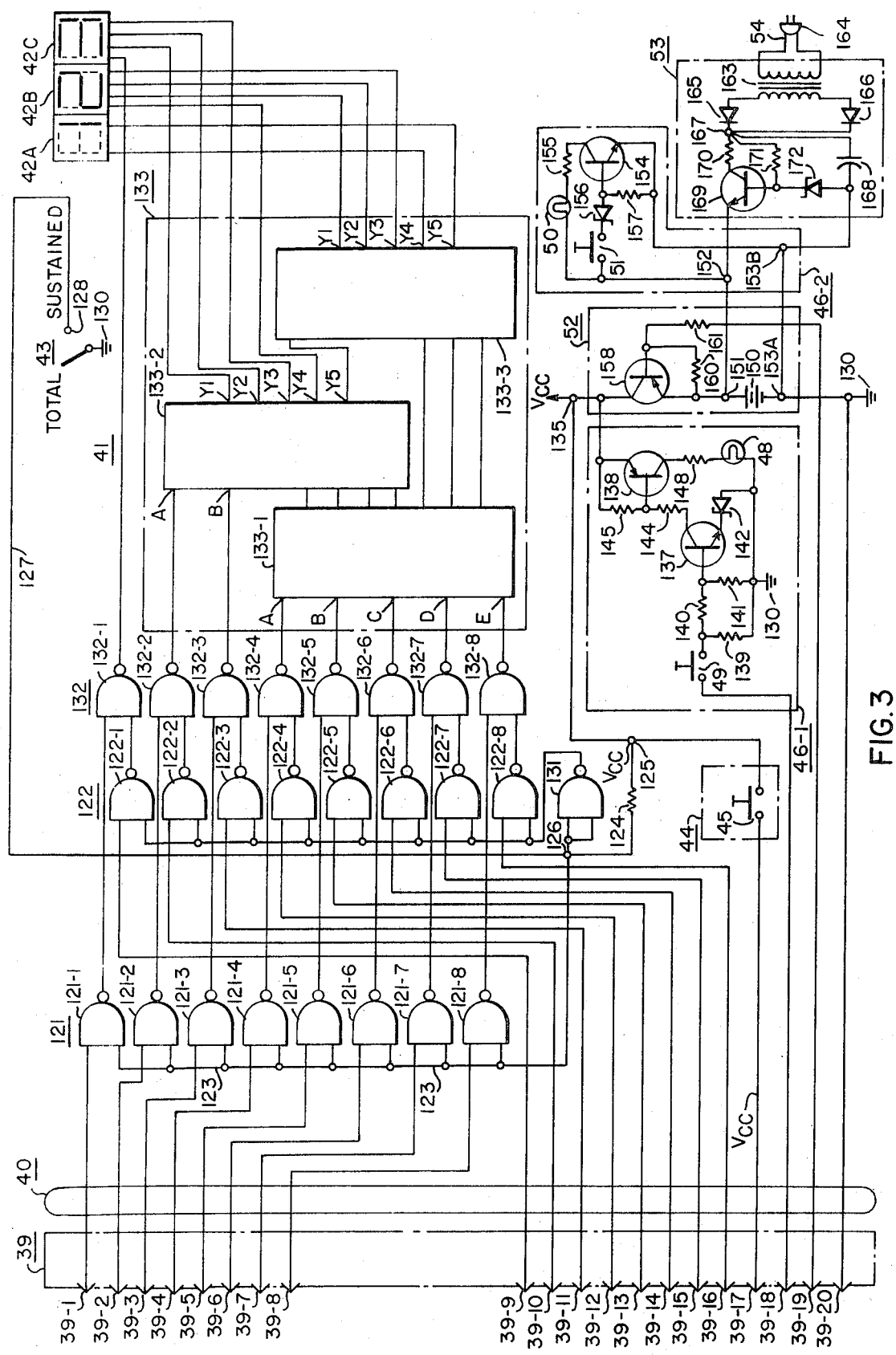
FIG. 3 is a combined logic and electrical schematic circuit diagram of the readout and tester unit shown in FIG. 1.

Referring now to FIG. 3, there is shown a combined logic and electrical schematic circuit diagram of the readout and tester unit 29. The input to the unit 29 is provided through the cable conductor 40 as shown in FIG. 1, and the plug connector 39 which mates with the socket connector 38 of the monitor unit 28. The connector terminals 39-1, 39-2, 39-3, 39-4, 39-5, 39-6, 39-7, 39-8, 39-9, 39-10, 39-11, 39-12, 39-13, 39-14, 39-15, 39-16, 39-17, 39-18, 39-19 and 39-20 are detachably connectable with the corresponding connector terminals designated 38-1 through 38-20, respectively, for providing the inputs to the readout and tester unit. The terminals 39-1 through 39-8 and 37-9 to 37-16 are connected to the decoding and display section 41 for providing the numerical readout at the numerical readout light assemblies 42A, 42B and 42C corresponding to the binary count of the monitor unit counters 34 and 37. A first set 121 of two-input NAND gates 121-1, 121-2, 121-3, 121-4, 121-5, 121-6, 121-7, 121-8 have one input of each connected in corresponding consecutive numerical order to the connectors terminals 39-1 through 39-8, respectively, as shown in FIG. 3. Accordingly, the gate 121-1 is connected to the $2^0$ bit output of the counter 34, the gate 121-2 has an input connected to the $2^1$ bit output of the counter 34 and in following order through the gate 121-8 having an input connected to the $2^7$ bit output.

Correspondingly, a second set 122 of two-input NAND gates 122-1, 122-2, 122-3, 122-4, 122-5, 122-6, 122-7 and 122-8 have one input pf each connected in corresponding consecutive numerical order to the connector terminals 39-9 through 37-16, respectively. This connects the gate 122-1 to the $2^0$ bit output of the counter 37. The remaining NAND gates of the second set are connected in order to the outputs of the counter 37, thus the gate 122-8 is connected to the $2^7$ bit output of the counter 37. Each of the sixteen two input NAND gates noted above are included in Quadruple 2-Input Positive NAND Gate Circuit Type SN74LOO available from the Texas Instruments Incorporated, Dallas, Texas, and is described in The Integrated Circuits Catalog for Design Engineers, First Edition.

The remaining and enabling inputs to the first NAND gate set 121 are connected to a conductor 123 to inhibit each gate therein when it has a predetermined voltage state. The conductor 123 is connected through a resistor 124 to the supply voltage $V_{CC}$ provided at the junction 125 as described further hereinbelow. The supply voltage $V_{CC}$ at the junction 125 is capable of providing a logic one gate enabling input. These gates in the first set 121 are enabled to produce a one to zero logic pulse transition at the output thereof in response to zero to one logic pulse transitions applied to the connector terminals 39-1 through 39-8. The conductor 123 is further connected at a junction 126 to a conductor 127 connected to a fixed contact 128 included in the selector switch 43, shown in the upper right hand corner of FIG. 3 as a single pole, single throw type. A moving contact arm 129 of the switch 43 is connected to a common source of ground 130 provided in the circuit of the unit 29. In the contact disengaging position of the switch 43, shown in FIG. 3, the first set of gates 121 are enabled and when in the contact engaging position the ground potential 130 is applied through contact 128 to the first set of gates 121 so that they are inhibited from producing a binary coded output.

The two-input NAND gate 131 shown at the bottom of FIG. 3 is of the aforementioned type SN74LOO and has the two inputs connected together and to the junction 126 so that it forms a NOT logic gate function and develops a logic zero output in response to the one logic state normally applied by the supply voltage $V_{CC}$ at the junction 126. The output of the gate 131 is connected to the enabling inputs of each of the second set of NAND gates designated 122-1 through 122-8 so that when the switch 43 is in the contact disengaging position shown, the second set of NAND gates 122 are disabled while the first set of gates are enabled. Conversely, when a switch 43 is in the contact engaging position, the first set of gates 121 are disabled and the second set of gates 122 are enabled. This permits alternate parallel readouts of the first set of gates 121 or the second set of gates 122 in response to the corresponding readouts of the associated monitor unit counters 34 or 37 for decoding and visual numerical display as described more fully hereinafter.

A third set 132 of two-input NAND gates each corresponding to the type SN74LOO noted above includes NAND gates 132-1, 132-2, 123-3, 132-4, 132-5, 132-6, 132-7 and 132-8. The two inputs of each of the gates of the third set of gates 132 are connected to one gate output of a gate in each of the first and second sets 121 and 122. Accordingly, the first gates 121-1 and 122-1 of the first and second sets are connected to the two inputs of the gate 132-1. The second through the eighth gates (121-2 through 121-8 and 122-2 through 122-8) in each of the first two sets of gates 121 and 122 are correspondingly connected to the two inputs of the second through the eighth gates 132-2 through 132-8 of the third set of gates 132. Thus, the outputs of the gates 121-8 and 122-8 are connected to the inputs of gate 132-8. When one of the first or second set of gates, 121 or 122, is enabled by the position of the switch 43, a one logic state is produced by all of the disabled gates of the other set which in turn is applied to one of the inputs of all of the gates of the third set 132. When a one logic state appears at the outputs of the enabled set of gates, the zero logic state appears at the output of the associated gate of the third set 132. Thus, a one logic state from the monitor unit counters 34 or 37 of FIG. 2 produces a one logic state from the third set of gates 132. The gates 132-1 through 132-8 correspond to the $2^0$ through $2^7$ bit outputs of the monitor unit counters 34 and 37 in accordance with the above-described arrangement.

An eight bit binary-to-BCD converter 133 is formed by three-six bit binary-to-BCD converters 133-1, 133-2 and 133-3. These six bit converters are of a type SN54185 available from the Texas Instruments Incorporated, Dallas, Texas, and are described in the aforementioned Integrated Circuits Catalog for Design Engineers at pages 9–144 et seq. The three converters are connected together as shown on pages 9–147 and FIG. 5 of the above-identified catalog to form the eight bit converter. Accordingly, the outputs of the gates 132-2 and 132-3 are connected to the A and B inputs of the converter 133-2, the outputs of the gates 132-4, 132-5, 132-6, 132-7 and 132-8, are connected to the A, B, C, D and E inputs respectively of the converter 133-1 in accordance with the above-identified eight bit binary-to-BCD converter connection.

The numerical readout light assemblies 42A, 42B and 42C each include a decimal digit readout section to provide a three digit numerical readout. Each of the readout lights 42A, 42B and 42C is of a type 730001 available from the Dialight Corporation and described the application publication S100-127-0145-00 dated Aug. 31, 1971. These readout light assemblies include a four input decoder circuit and seven light segments. The readout light assembly 42C is the last significant or units digit and accordingly receives four inputs, one from the output of the gate 132-1 and the remaining three from the Y1, Y2 and Y3 outputs of the converter 133-2. Correspondingly, the next significant or tens digit is provided by the readout light assembly 42B which receives inputs from the Y4 output of the converter 133-2 and the Y1, Y2 and Y3 outputs of the converter 133-3. The most significant digits are provided at the Y4 and Y5 outputs of the converter 133-3 which re connected to the readout light assembly 42A. This provides either the one or two hundredths readings at the readout light 42A.

Thus, it is seen that depending upon which of the outputs monitor unit counters 34 or 37 are coupled through the first or second sets of gates 121 or 122 and to the third set of gates 132 and then to the converter 133, as determined by the position of the switch 43, the numerical readout lights assemblies 42A, 42B and 42C will provide a visual numerical readout of the accumulated binary count of the selected monitor unit counter.

Referring now to the remaining sections of the readout and tester unit 29, the monitor reset section 44 shown in the lower portion of the FIG. 3 includes the switch 45 connected in series with the connector terminal 39-17 and a junction 125 which in turn, is connected with the supply voltage $V_{CC}$ at the junction 135. Accordingly, when the reset switch 45 is closed the voltage $V_{CC}$ appears at the monitor unit connector terminal 38-17 shown in FIG. 2. This develops a logic one binary signal on the conductor 106 which is applied to the reset inputs 104, 105 and 119 of the binary counters 34 and 37 to return a count of the counters to zero.

The batteries test section 46 is included within the two blocks 46-1 and 46-2 in FIG. 3. The monitor unit battery test indicator lamp 48 in block 46-1 and switch 49 includes NPN and PNP type transistors 137 and 138, respectively. The transistor 137 is a type 2N2217A and transistor 138 is a type 2N2905A in one preferred embodiment. The resistors 139, 140 and 141 are connected as indicated between the base of the transistor 137 and the circuit ground 130. A Zener diode 142, having a Zener voltage in the order of 2.7 volts, in one preferred embodiment, is connected between the ground 130 and the emitter of the transistor 137. The collector of the transistor 137 is connected to a biasing resistor 144 which is connected to the base of transistor 138. A biasing resistor 145 is connected between the base and emitter of transistor 138. The collector of transistor 138 is connected to a resistor 148 and in series with the indicator lamp 48 and the ground 130. The switch 49 is connectable through the connector terminal 39-18 to the monitor unit connector terminal 38-18 and, therefore, to the positive terminal of the monitor unit battery 75 at the junction 76 as shown in FIG. 2. The monitor unit ground 74 is connected through the monitor unit connector terminal 38-20 to the tester unit connector terminal 39-20 which is connected with the tester unit ground 130 so that the two circuit grounds 74 and 130 are commonly connected together when the connectors 38 and 39 are attached.

The batteries test section 46 further includes the block 46-2 having an indicator light 50 and the switch 51 for providing an indication of the internal of the condition of the battery 150 of the internal battery section 52 the readout and tester unit 29 that is provided to supply the $V_{CC}$ voltage to the electrical circuits therein. The battery 150 is, for example, of a nickel-cadmium type being rechargeable as described in connection with the detail description of the section 53. The battery 150 has a nominal terminal of the battery 150 is connected to the circuit ground 130 and the positive terminal is connected at the circuit junction 151. The internal battery test circuit is connected across the terminals of the battery 150 at the circuit junctions 152 and electrically common junctions 153A and 153B and includes a transistor 154 of the NPN type 2N3741 in one preferred embodiment. The emitter to collect circuit is connected in series with the junction 153B. The collector is connected in series with a resistor 155 and the indicator lamp 50 and to the junction 152. The switch 51 is connected in series with the junction 152 and a Zener diode 156 connected to the base of the transistor 154. A biasing resistor 157 is connected across the base to emitter circuit. The Zener diode has a Zener voltage in the order of 4.3 volts in one preferred embodiment and the proper operating voltage condition of the battery 150 is indicated when the voltage is sufficient to reach the breakdown voltage of the Zener diode 156 and bias the transistor 154 conductive so as to complete a series circuit between the battery terminals and the lamp 50. This energizes the lamp 50 to indicate that the voltage of the battery 150 is sufficient to develop a proper supply voltage $V_{CC}$ at the junction 135 which is in the order of 5 volts.

The internal battery section 52 includes a switching transistor 158 which has an emitter to collector circuit thereof connected in series with the positive terminal of the battery 150 and between the junction 151 and the voltage supply $V_{CC}$ junction 135. The transistor 158 is of a PNP type 2N3741 in one preferred embodiment and a resistor 160 is connected across the emitter to base circuit and a resistor 161 is connected in series with the base circuit at the junction with the resistor 160. The resistor 161 is further series connected with the connector terminal 38-19 which is connectable to the monitor unit connector terminal 38-19 and to the monitor unit circuit ground 74. As noted above, this connects the circuit grounds 74 and 130 in common so that a complete circuit is formed in the base biasing circuit of the transistor 158 to bias it conductive when the connector parts 38 and 39 are attached together. When the connector parts are disconnected, the base biasing circuit of the transistor 158 is disconnected from the ground source 130 and the negative terminal of the battery 150 so it is rendered deenergized and thereby isolates the voltage supply $V_{CC}$ junction 135 from the battery 150. This removes the voltage $V_{CC}$ at each of the logic ciruçits in the readout and test unit 29 and also from the circuit including the transistors 137 and 138 of the battery test block 46-1 and the monitor unit battery test lamp 48 and switch 49.

The remaining battery charger section 53 of the readout and tester unit 29 includes a power transformer 163 having a primary connected to the external cord plug connector 164 which is adapted to be plugged into a conventional sixty hertz 120 volts source of power. The secondary of the transformer 163 is rectified by the diodes 165 and 166 to produce a positive rectified sixty hertz signal at the junction 167. A filtering capacitor 168 is connected between the circuit ground 130 and the junction 167 to smooth out the rectified voltage from the transformer 163. A series regulating transistor 169 of the NPN type 2N2219A in one preferred embodiment is connected at its collector to a resistor 170 which is connected between the collector and the junction 167. A biasing resistor 171 is connected between the transistor base and the junction 167. A Zener diode 172 having a Zener voltage in the order of 7.5 volts is connected with the polarity shown in series with the circuit ground 130 and the transistor base. The emitter of the transistor 169 is connected to the junction 152 and, accordingly, to the positive terminal of the battery 150. Since the negative terminal of the battery 150 is connected to the circuit ground 130 a completed charging circuit is formed through the emitter to collector circuit of the regulating transistor 169. Accordingly, the battery 150 may be charged by plugging the plug 164 of the cord 54 to a conventional 120 volt convenience outlet.

Referring now to the operation of the improved monitor unit 28 and of the readout and tester unit 29 of the system 10, the monitor unit 28 is initially installed at the transformer apparatus 12 under test as shown in FIG. 1 to receive inputs from sensing arrangements responsive to the overcurrent events to be monitored. Either one or the other or a combination of the current sensing arrangements which are connected to the pairs of inputs terminals 56-1 & 56-2, 57-1 & 57-2, 58-1 & 58-2 and 59-1 & 59-2, or the pairs of input terminals 60-1 & 60-2, 61-1 & 61-2 and 62-1 & 62-2 shown in FIG. 2. The latter sensing arrangement has the advantage of isolating the variations in amplitude of the current from the circuit. However, the current responsive input voltages V1, V2, V3 or V4 can have adverse amplitude variations which are advantageously isolated by the circuit of the monitor unit 28.

As an aid in understanding the operation of the monitor unit 28 reference is now made to the time graphs I through VI of signals illustrated in FIG. 4 which may occur in the logic circuit of the monitor unit 28 illustrated in FIG. 2. These signals are not to scale and are designated with the same numerals to correspond to the same designated signals illustrated at the point of occurrence in FIG. 2. The one and zero levels designated in the graphs substantially correspond to the $V_{CC}$ and ground potentials of the unit 28 whereas the logic one and zero threshold triggering levels of the logic circuits are below and above, respectively, these potentials as determined by the operating characteristics of the logic circuits. The top graph I of FIG. 4 illustrates the output logic signal 83 of the logical threshold detector 31 which is normally in the logic one binary signal state so long as the monitored currents are below the overcurrent condition. When an overcurrent condition is reached at time T1, the increased level of the affected voltage output V1, V2, V3 or V4 of the rectifier circuits 68, 69, 70 or 71, after being filtered by the filtering circuit of the input 30, triggers the NAND gate 81 to the logic zero state for the time that the overcurrent condition exists. In the case of an overcurrent operated switch closure inputs S1, S2 and S3, the power supply voltage $V_{CC}$ is applied to the input of the NAND gate 81 as a logical one and, accordingly, a logic zero is produced at the output. The threshold detector circuit 32 is important in isolating the remaining portion of the monitor unit circuit which is thereafter responsive only to the logic state of the output signal 83 of the gate 81 and therefore cannot be affected by any wide ranges in the varying amplitude or timing of the overcurrent conditions occurring in the circuit under test.

At time T1 in graphs of FIG. 4 a first overcurrent event is assumed to have occurred which extends for an interval to time T2 in which the interval is about one complete cycle of the 60 hertz frequency of the current being detected. A second overcurrent condition is developed between the times T3 and T6. The Time T3 is before the period of one to two current cycles from the time T2 and therefore before approximately twenty milliseconds. The time T6 is taken as being at an instant after a period required for approximately ten cycles of the frequency of the monitored current to occur from the time T1 and therefore after approximately 200 milliseconds from time T1. Other occurrences of overcurrent conditions may happen at randomed intervals but the sequency illustrated by the graph I is taken as exemplary for purposes of understanding the operation of the monitor unit 28 shown in FIG. 2.

The graph II illustrates the output signal 92 of the pulse stretcher 32 which is triggered from the zero to one logic state in response to the one to zero logic transition developed at the input thereof by the signal 83.

The one to zero logic input transition of signal 83 renders the diode 90 in FIG. 2 conductive and the capacitor 91 is charged quickly from one polarity to the opposite polarity due to the low dynamic resistance of the diode 90. Accordingly, the output signal 92 quickly changes to the one logic state. The one state is held between times T1 and T2 by the zero logic state of the signal 83 of the detector circuit 31. At time T2, the zero to one state transition of signal 83 reverse biases the diode 90 so that current is applied through the resistor 88 to charge the capacitor 91 in the reverse polarity. The linear capacitor charging rate is established by the pulse time delaying interval so as to maintain the effective one logic level at the output of the circuit 32 for approximately 20 milliseconds before the effective zero logic state is reached. The capacitor charging current is held linear due to an operational amplifier type of circuit function.

When the next pulse occurs, at time T2, before the 20 milliseconds time delay has elapsed, the output signal 92 of the circuit 32 is driven more positive and is held constant in the one state by the return of current passing through the diode 90. The constant one and zero states of the signal 92 shown in graph II corresponds to the output levels of the gate 85 when operating only as a logic element. At time T6 the signal 92 begins to drop linearly toward the zero state which is reached at time T8. At time T7 the effective zero logic state threshold of the circuit 33 is reached at the predetermined 20 milliseconds of desired pulse time delay interval. The total charging time, between times T6 and T8, is, therefore, slightly longer than the circuit switching response delay time. Accordingly, it is to be noted that instantaneous fluctuations occurring at less than approximately 20 millisecond intervals are thereby not detected and will not be recorded as a separate overcurrent event due to the operation of the pulse stretcher 32.

The graph III indicates the one to zero logic transition developed in the signal 100 of the triggering circuit 33 that is applied to the counting input 99 of the binary counter 34 to establish an additional binary count therein. Thus, an increase of one of the total events will be stored by the counter.

The graph IV illustrates the effect of the output signal 92 shown in graph II as it is also applied to the resistor 109 and diode 110 input of the pulse interval recognition circuit 35 to initiate the signal 111 at the common input junction 107 of the gate 108. The capacitor 112 will be considered as being previously charged by the zero state of signal 92. The graph V illustrates the output signal 113 of the pulse interval recognition circuit 35 which will be at the one logic state before time T1. At the time T1, signal 92 establishes the one logic state at the input to the resistor 109 and diode 110 and since the diode 110 is reverse biased, current flows through the resistor 109 to charge the capacitor 112 in the reverse polarity at the predetermined pulse time delaying rate from the charged state established before time T1. The output signal 113 decreases linearly at a constant rate so as to retain an effective one logic state for approximately 200 milliseconds before reaching an effective zero logic state corresponding to the threshold of the triggering pulse circuit 36 at time T4. The constant zero logic state is reached at time T5 of the signal 113 at the end of the capacitor charging time which is in the order of 350 milliseconds from the time T1. During this time interval the circuit 35 functions in a linear amplifier mode as an operational amplifier circuit does as noted above for the pulse stretcher 32.

The graph VI illustrates the signal 117 which changes state upon the signal 113 reaching the effective zero state corresponding to the input triggering threshold of the gate 114 of the triggering pulse circuit 36 at time T4. A zero logic state is initiated in the output signal 117 to trigger the input 118 of the binary counter 37 to add one count to the sustained events counted and presented at the outputs of the counter 37.

When the sustained overcurrent event has terminated at time T6 the signal 92 returns toward the zero state, as noted above, and at approximately time T7 forward biases the diode 110 so that the capacitor 112 is charged quickly to an opposite state as indicated by the return of the output signal 113 to the one logic state. This effects return of the triggering pulse circuit output signal 117 to the one state at the counter circuit input 118. The charging of the capacitor through the diode 110 is in the order of $10^{+5}$ times faster than the opposite charging through the resistor 109. The charging through the diode is substantially instantaneous and gate output has a transition time equal to the normal switching characteristic of the NAND gate circuit.

Referring now to the operation of the readout and tester unit 29 as shown in FIG. 3, it is contemplated that the unit 29 may be used to readout and test several of the monitor units 25. Accordingly, the connector 39 is plugged into a connector 38 of a monitor unit 28, shown in FIG. 2. Initially, this connection connects the connector terminals 39-19 and 38-19 together so that the biasing circuit of the transistor 158 is completed in the internal battery section 52 to bias the transistor 158 conductive. The output of the battery 150 is effectively applied to the supply voltage junction 135 to thereby energize the various circuits of the unit 29 as noted above. This provision prevents inadvertent use of a battery power when the tester is not connected to a monitor unit.

To obtain either of the total of overcurrent events or, the number of sustained overcurrent events, the selector switch 43 is positioned accordingly. The open or disengaging switch position enables the first set of gates 121 and if a binary count 01111011, for example, has been accumulated in the binary counter 34 due to one hundred twenty-three total events being detected, the corresponding binary logic will be formed at the connector terminals 38-1 through 38-8 which will pass through to the third set of gates 132 to the binary-to-BCD converter 133. The output of the converter will cause the readout light assemblies 42A, 42B and 42C to light the appropriate segments thereof and display "123," as illustrated. Similarly, when the switch 43 is placed to obtain a readout of the sustained overcurrent events, the switch movable contact arm 129 engages contact 128 to enable the second set of gates 122 which receives the appropriate binary logic signals at the terminals 38-9 through 39-16 as developed at the bit outputs of the binary counter 37. Similarly, the readout lights 42A, 42B and 42C provide the decimal visual readout of the sustained overcurrent events detected.

The reset switch 45 is closed to reset the count of both of the counters 34 and 37 to zero by applying the supply voltage $V_{CC}$ from the junction 125 to the counter reset inputs 119, 105, and 104 shown in FIG. 2.

To measure the condition of the battery 75 in the monitor unit 29, the switch 49 is closed and if adequate battery voltage is available at battery 75, the transistor 137 and the transistor 138 will be biased conductive to light the lamp 48 which will visually indicate that the satisfactory voltage condition. During use or prior to use in reading out the accumulated counts of the monitor unit 29, the internal battery test switch 51 may be closed to determine if the battery 150 of the readout and tester unit 29 has sufficient battery terminal voltage present. If so, the transistor 154 will be biased conductive to illuminate the indicator lamp 50.

As noted hereinabove, when the readout and tester unit is placed in storage or at other desired times the rechargeable battery 150 maybe charged through an internal charging circuit 53 which is rendered operable by plugging in the plug 164 to a conventional convenience outlet receptacle. This source of voltage causes the circuit 53 to apply the appropriate rectified and regulated charging voltage across the terminals of the battery 150.

While the embodiment disclosed hereinabove is preferred, it is apparent that there are numerous modifications and arrangements which may be within the spirit and scope of this invention.

I claim:

1. In an overcurrent events monitoring system, a monitor unit for digitally distinguishing and counting momentary and sustained occurrences of excessive current magnitudes in a circuit under test, said monitor unit comprising:

a logical threshold detector including an input and an output, said input being responsive to each of said occurrences of excessive current magnitudes, and said output developing first logic signals of first and second states having transitions therebetween in one and opposite directions upon each of said occurrences and at the end of said occurrences, respectively;

a pulse stretcher including a logic gate circuit including an input and an output, said output developing second logic signals of first and second states having transitions therebetween in one and opposite directions, said input being responsive to said one direction of transistion of said first logic signals so as to develop a normal gate circuit transition in one direction to effect a transition in said second logic signals in said one direction, and said pulse stretcher further including a time delay circuit means connected between said input and said output of the gate circuit to effect a linearly extended transition in an opposite direction in said second logic signals in response to said opposite direction of transition in said first logic signals;

a first binary counter responsive to said one direction of transition in said second logic signals so as to accumulate the total of occurrences of excessive current magnitudes occurring at intervals substantially equal to or longer than the linearly extended transition in said second logic signals;

a pulse interval recognition circuit including a logic gate circuit including an input and an output, and a time delay circuit means connected between said input and said output and externally of said gate circuit, said input being responsive to said second logic signals, said output developing third logic signals of first and second states having transitions in one and opposite directions therebetween, said third logic signals having a transition in said one direction in response to a normal gate circuit transition in said one direction between said first and second states in response to the opposite direction of transition in said second logic signals, said third logic signal having a linearly extended transition in an opposite direction between said first and second states, said last named extended transition in said third logic signals being established by said time delay circuit means so as to be longer than the extended transition in said second logic signal, and a second binary counter means responsive to said opposite direction of transition in said third logic signals so as to accumulate the number of sustained occurrences of excessive current magnitudes occurring during an interval substantially equal to or longer than said linearly extended transition in said third logic signals.

2. The overcurrent events monitoring system as claimed in claim 1, wherein said pulse stretcher of said monitor unit includes said time delay circuit means having a capacitor connected between said input and said output of said logic gate circuit, and further has a resistor connected in series with said input of said logic gate circuit to establish a predetermined charging time for said capacitor and thereby control said linearly extended transition in said opposite direction in said second logic signals, said time delay circuit means further including a diode connected across said resistor to effect the normal gate circuit transition in said one direction in said second logic signals.

3. The overcurrent events monitoring system as claimed in claim 2, wherein said pulse interval recognition circuit of said monitor unit includes said time delay circuit means having a capacitor connected between said input and said output of said logic gate circuit, and further has a resistor connected in series with said input of said logic gate circuit to establish a predetermined charging time for said capacitor which is longer than the charging time of said capacitor of said pulse stretcher and thereby control the linearly extended transition in said opposite direction in said third logic signals, said time delay circuit means further including a diode connected across said resistor to effect the normal gate circuit transistor in said one direction in said third logic signals.

4. The overcurrent events monitoring system of claim 1, wherein said excessive current magnitudes in the circuit under test occur in a current having a frequency of substantially sixty hertz, and wherein said linearly extended transition of said second logic signals is slightly longer than between one to two cycles of the current frequency, and further wherein said linearly extended transition of said third logic signals is slightly longer than ten cycles of the current frequency.

5. The overcurrent events monitoring system of claim 3, wherein each of said logic gate circuits of said pulse stretcher and said pulse interval recognition circuit includes a separate two input NAND gate having said two inputs thereof connected together.

6. The overcurrent events monitoring system of claim 1, including a plurality of pairs of input terminals, predetermined pairs of said pairs of input terminals each including one input terminal being connected to a direct current voltage source and the other input terminal being connected with said input of said logical threshold detector.

7. The overcurrent events monitoring system of claim 6, including a magnetically actuated switch inductively coupled to said circuit under test so as to effect a switch closure in response to said occurrence of excessive current magnitude, said magnetically actuated switch being connected across one of said predetermined pairs of input terminals.

8. The overcurrent events monitoring system of claim 1, including connector means having a terminal connected to outputs of said first and second binary counters, said system further including a readout and tester unit, said readout and tester unit having connector means detachably mating with said connector of said monitor unit, said readout and tester unit further having a decoding and numerical display section having a binary coded decimal converter and a numerical readout light means, said converter being connected between said connector and said readout light means for displaying the numerical count contained in said first and second binary counters.

9. The overcurrent events monitoring system of claim 8, wherein said readout and tester unit has a first, a second and a third set of logic gate circuits having gating and enabling inputs, said first and second sets of logic gate circuits having said gating inputs connected to said connector so as to be connected to said first and to said second binary counters, respectively, said gating and enabling inputs of said third set of logic gate circuits being connected to the outputs of said first and second sets of said logic gate circuits, gate enabling circuit means including a selector switch connected to said enabling inputs of said first and second sets of logic circuits so that the position of said selector switch provides outputs from one or the other of said first and second sets of logic gate circuits that is effective to develop corresponding outputs from said third set of logic circuits, and the outputs of said third set being connected to said binary to binary-coded-decimal converter.

10. The overcurrent events monitoring system as claimed in claim 9, wherein said monitor unit includes a battery power supply; said readout and tester unit includes a battery power supply and a solid state voltage responsive circuit including an indicator means connected through said connectors of said monitor and said readout and tester unit and across said battery power supply of said monitor unit to provide an indication of the condition of the monitor unit battery power supply.

* * * * *